US011421437B2

United States Patent
Ma et al.

(10) Patent No.: US 11,421,437 B2
(45) Date of Patent: Aug. 23, 2022

(54) COMPOSITE CROSSARM AND TRANSMISSION POLE

(71) Applicant: JIANGSU SHEMAR ELECTRIC CO., LTD., Nantong (CN)

(72) Inventors: Bin Ma, Nantong (CN); Jie Yu, Nantong (CN); Dequan Li, Nantong (CN); Jiang Fang, Nantong (CN)

(73) Assignee: JIANGSU SHEMAR ELECTRIC CO., LTD., Nantong (CN)

( * ) Notice: Subject to any disclaimer, the term of this patent is extended or adjusted under 35 U.S.C. 154(b) by 940 days.

(21) Appl. No.: 16/304,997

(22) PCT Filed: May 17, 2018

(86) PCT No.: PCT/CN2018/087362
§ 371 (c)(1),
(2) Date: Nov. 27, 2018

(87) PCT Pub. No.: WO2018/223829
PCT Pub. Date: Dec. 13, 2018

(65) Prior Publication Data
US 2021/0180358 A1    Jun. 17, 2021

(30) Foreign Application Priority Data

Jun. 9, 2017  (CN) .......................... 201710431830.3

(51) Int. Cl.
*E04H 12/24*     (2006.01)
*H02G 7/20*      (2006.01)
*E04H 12/10*     (2006.01)

(52) U.S. Cl.
CPC .............. *E04H 12/24* (2013.01); *H02G 7/20* (2013.01); *E04H 12/10* (2013.01)

(58) Field of Classification Search
CPC .......... E04H 12/10; E04H 12/24; H02G 7/20; F16L 3/04; F16L 3/1016
See application file for complete search history.

(56) References Cited

U.S. PATENT DOCUMENTS

| 2,437,375 A |   | 3/1948 | Buxton |
| 2,606,952 A | * | 8/1952 | Cofer ..................... E04H 12/24 52/156 |

(Continued)

FOREIGN PATENT DOCUMENTS

| CN | 1019536 | 12/1992 |
| CN | 2361754 | 2/2000 |

(Continued)

OTHER PUBLICATIONS

Machine translation for CN 102270529A. Accessed from eSPACENET Mar. 2, 2022 (Year: 2022).*

(Continued)

*Primary Examiner* — Christine T Cajilig
(74) *Attorney, Agent, or Firm* — Seyfarth Shaw LLP

(57) ABSTRACT

A composite crossarm fixed on a pole body of a transmission pole is disclosed. The composite crossarm includes: a core rod, an insulating layer and a load-bearing member. The insulating layer and the load-bearing member cover and are fixed to an outer peripheral surface of the core rod. The load-bearing member is positioned in a middle region of the core rod connected to the pole body, and the insulating layer is positioned in regions of the core rod other than the middle region. A transmission pole using the above composite crossarm is also disclosed. In the above manner, the load-bearing member is arranged at a position where the core rod is connected to the pole body in advance. On one hand, the core rod is able to be connected to the pole body without providing with a hole. On the other hand, the load caused by the fixed connection is applied on the load-bearing member (Continued)

directly, with no damage to the insulating layer. Both the load-bearing member and the insulating layer cover and are fixed on the outer peripheral surface of the core rod, so that the core rod is protected from external corrosion, to ensure the mechanical properties of the composite crossarm.

10 Claims, 8 Drawing Sheets

(56) References Cited

U.S. PATENT DOCUMENTS

| | | | | |
|---|---|---|---|---|
| 5,961,248 | A * | 10/1999 | Tourtellotte | F16B 7/0493 |
| | | | | 403/385 |
| 6,031,187 | A * | 2/2000 | Giampieretti | H02G 7/20 |
| | | | | 174/209 |
| 6,305,424 | B1 * | 10/2001 | Delouvee | F16L 3/04 |
| | | | | 248/74.1 |
| 6,626,406 | B1 | 9/2003 | Olson, Jr. | |
| 10,167,997 | B2 * | 1/2019 | Britt, Jr. | F16B 7/18 |
| 2015/0075859 | A1 | 3/2015 | Rodriguez et al. | |

FOREIGN PATENT DOCUMENTS

| | | | | |
|---|---|---|---|---|
| CN | 201217967 | | 4/2009 | |
| CN | 201601455 | | 10/2010 | |
| CN | 201601455 U | * | 10/2010 | |
| CN | 102270529 | | 12/2011 | |
| CN | 102270529 A | * | 12/2011 | |
| CN | 103306382 | | 9/2013 | |
| CN | 105971365 | | 9/2016 | |
| CN | 106088785 | | 11/2016 | |
| CN | 106088785 A | * | 11/2016 | ............. E04H 12/02 |
| CN | 107165466 | | 9/2017 | |
| CN | 206917388 | | 1/2018 | |
| FR | 2466888 A1 | * | 4/1981 | |
| FR | 2566973 A1 | * | 1/1986 | |
| KR | 10-0950096 B1 | | 3/2010 | |
| WO | 2009049377 | | 4/2009 | |
| WO | WO-2009049376 A1 | * | 4/2009 | ............... H02G 7/05 |
| WO | 2017211208 | | 5/2017 | |
| WO | 2017211207 | | 12/2017 | |

OTHER PUBLICATIONS

Machine translation for CN 106088785. Accessed from eSPACENET Mar. 2, 2022 (Year: 2022).*
European Search Report for Application No. 18804217.0 dated Feb. 7, 2020, 8 pages.
Search Report for PCT/CN2018/087362 dated Jul. 31, 2018, 4 pages.
Written Opinion for PCT/CN2018/087362 dated Jul. 31, 2018, 6 pages.
Office Action for Application No. CN201710431830.3 dated Aug. 1, 2018, 13 pages.
Search Report for CN201710431830.3, 3 pages.

* cited by examiner

COMPOSITE CROSSARM AND TRANSMISSION POLE

CROSS REFERENCE TO RELATED APPLICATIONS

This is a National Stage application of, and claims priority to, PCT/CN2018/087362, filed May 17, 2018, which claims priority to Chinese Patent Application No. 201710431830.3, filed Jun. 9, 2017, the disclosures of which are incorporated herein by reference in their entirety.

TECHNICAL FIELD

The present disclosure relates to the field of power transmission insulation equipment, and more particularly, to a composite crossarm and a transmission pole.

BACKGROUND

In the field of power equipment, crossarms for transmission lines are important structural components and accessories of the transmission pole, and used to support and hold conductor wires, overhead ground wires and others at certain safety distances according to regulations. At present, a metal crossarm, for example, an iron crossarm or a steel crossarm, is widely used in the transmission line with a voltage level less than or equal to 35 kV. Such metal crossarm is heavy in quality and poor in insulation, and is prone to flashover problems.

In order to solve the above problems of the metal crossarm, a composite crossarm has been developed, which is generally composed of an insulating core rod and sheds fixed on the insulating core rod. CN106088785A discloses a composite crossarm, both ends of which are provided with a metal fitting for hanging a line. Such composite crossarm has a middle region fixedly connected to a pole body of the transmission pole by drilling on the composite crossarm with a hole and fastening the composite crossarm to the transmission pole with a hoop and a fastener. However, drilling on the composite crossarm may seriously affect mechanical properties of the composite crossarm and reduce the capacity of the composite crossarm to bear load.

SUMMARY

An objective of the present disclosure is to provide a composite crossarm and a transmission pole to solve the problem of the prior composite crossarm that when the prior composite crossarm is fixed to a pole body of the transmission pole, the mechanical properties of the composite crossarm may be affected, thereby reducing the capacity of the composite crossarm to bear load.

In order to achieve the above objective, technical solutions are prevented by the present disclosure. A composite crossarm fixed on a pole body of a transmission pole is provided, and the composite crossarm includes:

a core rod, an insulating layer and a load-bearing member, wherein the insulating layer and the load-bearing member cover and are fixed to an outer peripheral surface of the core rod, the load-bearing member is positioned in a middle region of the core rod connected to the pole body, and the insulating layer is located in regions of the core rod other than the middle region.

On the one hand, the load-bearing member is arranged at a position where the core rod is connected to the pole body in advance, so that when the composite crossarm is mounted on the transmission pole, a load resulting from the fixation between the composite crossarm and the transmission pole may be applied directly to the load-bearing member, rather than to the core rod or insulating layer. And the core rod does not need to be perforated, so the core rod itself will not be deformed, and the insulating layer will not be worn due to long-term stress. The core rod covered by the insulating layer will not be exposed to the air to avoid corrosion of the core rod by the external environment. The load-bearing member has sufficient strength, and it will not be damaged by long-term stress, thereby ensuring the mechanical properties of the composite crossarm.

On the other hand, the load-bearing member and the insulating layer are positioned in different regions of the core rod, and both cover and are fixed to the outer peripheral surface of the core rod, so that the core rod is prevent from external corrosion, and the influence on the mechanical properties of the composite crossarm can be avoided.

In addition, the load-bearing member is positioned in a middle region of the core rod connected to the pole body. When the composite crossarm is used along with the transmission pole, at least two phases of conductor wires can be arranged on the composite crossarm by only one mounting. Thus, compared to fixing two identical composite crossarms on both sides of the pole body respectively, the installation process can be simplified, and the complexity of high-altitude operations can be reduced.

In one embodiment, the insulating layer is connected to the load-bearing member in a sealing type.

The sealing connection between the insulating layer and the load-bearing member can further prevent the corrosion of the core rod from the external environment such as moisture, and the like, and reduce the influence on the mechanical properties of the composite crossarm.

In one embodiment, the insulating layer is a shed and/or a sheath, and the shed and/or the sheath are sealingly connected to the load-bearing member.

In one embodiment, the insulating layer covers and is fixed to the regions of the core rod other than the middle region, after the load-bearing member covers and is fixed to the middle region of the core rod.

After the core rod of the composite crossarm has been made, the load-bearing member covers and is fixed to the middle region of the core rod firstly, and then the insulating layer covers and is fixed to the exterior of the core rod. Thus, the production process can be simplified and the connection between the insulating layer and the load-bearing member can be facilitated.

In one embodiment, the load-bearing member is a sleeve, and the sleeve has an inner wall with a shape corresponding to a cross section of the core rod covered by the sleeve.

In one embodiment, the sleeve is formed by a metal stamping process.

The metal stamping process is simple in flow, low in cost, and convenient for stamping various shapes of cross-sections, and has a strong adaptability to meet requirements of different cross-sections of the core rod.

In one embodiment, the composite crossarm is fixed on the pole body by a fixing device.

In one embodiment, the fixing device includes a crossarm receiving member and a pole body connecting member, the crossarm receiving member is used for receiving the sleeve, and the pole body connecting member is used for connecting the pole body and the crossarm receiving member.

In one embodiment, the crossarm receiving member includes a crossarm hoop and a connecting plate, the pole body connecting member is a pole body hoop, the connecting plate is provided with a first mounting member cooperated with the crossarm hoop, and a second mounting member cooperated with the pole body hoop. The crossarm hoop is fixed by the first mounting member after partly surrounding the sleeve along a circumferential direction of the sleeve, and the pole body hoop is fixed by the second mounting member after partly surrounding the pole body along a circumferential direction of the pole body.

In one embodiment, one side of the connecting plate facing the pole body is provided with an arc-shaped member adapted to the pole body.

In one embodiment, the crossarm receiving member includes a receiving portion and a first connecting sheet provided on the receiving portion, the pole body connecting member includes a hoop and a second connecting sheet provided on the hoop, the receiving portion is used for receiving the sleeve, the hoop is sleeved on the pole body, and the first connecting sheet is fixed to the second connecting sheet through a fastener.

In one embodiment, the load-bearing member is a sleeve mechanism, the sleeve mechanism includes a sleeve and a connecting plate, the sleeve covers and is fixed to the outer peripheral surface of the core rod, the connecting plate is fixed to one side of the sleeve, and the connecting plate is used for connecting with the pole body.

One side of the sleeve is provided with the connecting plate, and the sleeve is directly connected to the pole body through the connecting plate. The load-bearing member can play a role in fixing the crossarm side. In this way, the assembly process can be simplified, and the mounting complexity can be reduced.

In order to solve the above technical problem, another technical solution provided by the present disclosure is to provide a transmission pole including a pole body and the above-mentioned composite crossarm fixed on the pole body.

BRIEF DESCRIPTION OF THE DRAWING

FIGS. 1-5 are schematic diagrams illustrating a first embodiment of the present disclosure, wherein:

FIG. 1 is a schematic structural diagram illustrating a composite crossarm 10;

FIG. 2 is a schematic structural diagram illustrating a sleeve 103 in FIG. 1;

FIG. 3 is a schematic structural diagram illustrating that the composite crossarm 10 is mounted on a pole body 12 through a fixing device 11;

FIG. 4 is a perspective diagram illustrating a crossarm receiving member 110; and FIG. 5 is a schematic structural diagram illustrating an arc-shaped member on the crossarm receiving member 110.

FIGS. 6-8 are schematic diagrams illustrating a second embodiment of the present disclosure, wherein:

FIG. 6 is a schematic structural diagram illustrating a fixing device 21;

FIG. 7 is a schematic structural diagram illustrating a crossarm receiving member 210; and FIG. 8 is a schematic structural diagram illustrating a pole body connecting member 211.

FIGS. 9-11 are schematic diagrams illustrating a third embodiment of the present disclosure, wherein:

FIG. 9 is a schematic structural diagram illustrating a composite crossarm 30;

FIG. 10 is a schematic structural diagram illustrating a sleeve mechanism 303; and FIG. 11 is a schematic structural diagram illustrating that the composite crossarm 30 is connected to a pole body 32.

FIGS. 12-15 are schematic diagrams illustrating a fourth embodiment of the present disclosure, wherein:

FIG. 12 is a schematic structural diagram illustrating a composite crossarm 40;

FIG. 13 is a schematic structural diagram illustrating a sleeve mechanism 403;

FIG. 14 is a schematic structural diagram illustrating a pole body connecting plate 43; and FIG. 15 is a schematic structural diagram illustrating that the composite crossarm 40 is connected to a pole body 42.

DETAILED DESCRIPTION

As required, detailed embodiments of the present disclosure are disclosed herein. However, it is to be understood that the disclosed embodiments are merely exemplary of the present disclosure, which may be embodied in various forms. Accordingly, the specific details disclosed herein are not to be considered limiting, but merely as a basis for the claims and as a representative basis for teaching those skilled in the art to apply the present disclosure differently in any suitable manner in practice, including the use of the various features disclosed herein and in combination with features that may not be explicitly disclosed herein.

First Embodiment

Figure 1:
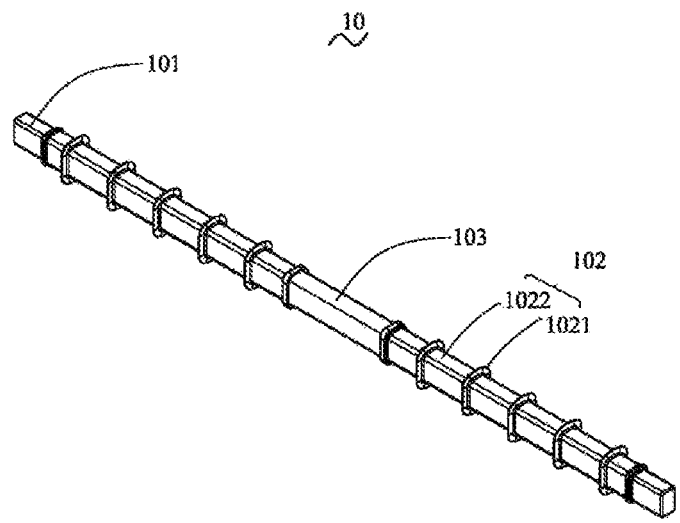

Please refer to FIGS. 1-5 together. As shown in FIG. 1, a composite crossarm 10 includes a core rod 101, an insulating layer 102 and a load-bearing member 103. The insulating layer 102 and the load-bearing member 103 cover and are fixed to an outer peripheral surface of the core rod 101. The load-bearing member 103 is located in a middle region of the core rod 101 connected to a pole body 12, and the insulating layer 102 is located in regions of the core rod other than the middle region.

Specifically, the core rod 101 is a main component of the composite crossarm 10, and is required to have sufficient supporting strength. The core rod 101 is generally formed by pultrusion of a mixture of glass fiber and resin. Of course, it may also be formed by mould pressing of a mixture of glass fiber and resin, or by other processes, which are not limited herein. The resin may be selected from polyurethane, epoxy resin, vinyl resin, or others.

The core rod 101 may be a solid body or a tube body having at least one chamber. The cross-sectional shape of the core rod 101 may be selected from a circular shape, a polygonal shape or an I-shaped shape, and may be selected as needed in practical engineering applications. The core rod 101 of the present embodiment is in a solid rectangular structure.

The core rod 101 may be exposed to the air for a long time, and may be easily corroded by various natural factors such as light, electricity, water, acid, etc., which may cause a surface aging to reduce the strength. Therefore, it is generally necessary to perform a surface treatment of the core rod 101 and it is common practice to cover the surface of the core rod 101 with the fixed insulating layer 102 to further improve the insulating performance of the core rod 101 and/or to function as corrosion protection.

The insulating layer 102 may be a shed 1021 and a sheath 1022 extending to the core rod 101, or may be a sheath 1022 covering the surface of the core rod 101. The shed 1021 or the sheath 1022 may be made of silicone rubber formed by compression-molding and vulcanization molding, or made of silicone rubber formed by integral injection molding. The insulating layer 102 has good hydrophobicity and aging resistance, and a high service life.

However, the insulating layer 102 does not have the ability to bear load. If the load is applied on the insulating layer 102 directly, it may easily cause cracking or falling off of the insulating layer 102, so that the core rod 101 may be exposed to the air, which may cause decrease in strength and mechanical properties.

Therefore, in the composite crossarm 10 of the embodiment, the load-bearing member 103 is arranged at a position where the core rod 101 is connected to the pole body 12 in advance. The load-bearing member 103 is generally a metal load-bearing member 103, and of course, it is not excluded that the load-bearing member is made of other materials having sufficient strength. The load-bearing member 103 may be connected to the pole body 12 directly or through an additional fixing device 11. No matter which connecting method, the core rod 101 is not required to be perforated to realize the connecting. The load caused by fixing and connecting is directly applied on the load-bearing member 103, and transmitted to the core rod 101 through the load-bearing member 103, without causing damage to the insulating layer 102 to expose the outer peripheral surface of the core rod 101 to the air.

Figure 2:
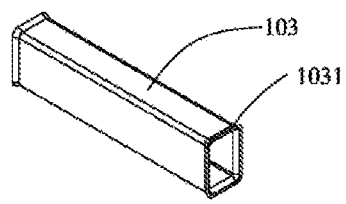

As shown in FIG. 2, optionally, the load-bearing member 103 may be a sleeve 103. The sleeve 103 may a hollow structure with openings at both ends. The sleeve 103 may have an inner wall in a shape corresponding to the cross-sectional shape of the core rod 101, and the inner wall may be in a shape of a rectangular. Optionally, the sleeve 103 may be formed by metal stamping process, which is simple in flow, low in cost, and convenient for stamping various shapes of cross-sections, and has a strong adaptability to meet the requirements of different cross-sections of the core rod. Optionally, the sleeve 103 may also be a steel pipe of a steel profile.

After the core rod 101 is formed by the pultrusion process, the sleeve 103 may be fixed to the middle region of the core rod 101 by gluing or crimping. The middle region is not limited to the region at the center the core rod 101. Each of left and right ends of the core rod 101 may be used to connect a metal fitting for hanging a line, or a pin insulator (not shown), and the middle region refers to a region of the core rod 101 other than the two ends.

The shed 1021 and the sheath 1022 may be formed on the core rod 101 located on the both sides of the sleeve 103 by injection molding. Optionally, the shed 1021 and the sheath 1022 at each side may be integrally molded by injection molding. The injection molding of the shed 1021 and the sheath 1022 may avoid the region of the metal fitting for hanging the line at the end. The sleeve 103 is provided with a flange 1031. The flange 1031 is provided to facilitate the sealing connection between the sleeve 103 and the sheath 1022.

It should be noted that, for the core rod 101 at the end region, before the injection molding of the shed 1021 and the sheath 1022, the metal fitting for hanging the line may be fixed to the end by gluing or crimping, and then the injection molding is performed on the core rod 101 at positions other than the positions of the sleeve 103 and the metal fitting for hanging the line. Alternatively, the shed 1021 and the sheath 1022 may be molded on the surface of the end region by injection molding, as long as the arrangement of the metal fitting for hanging the line or the pin insulator satisfies the requirement, which will not be specifically discussed herein.

The sleeve 103 may be fixed to the middle region of the core rod 101 and cover all the outer peripheral surface of the middle region. The shed 1021 and the sheath 1022 may cover the entire outer peripheral surface of the core rod 101 except the middle region and the end portion. The sleeve 103 may be sealingly connected to the shed 1021 and the sheath 1022 such that the core rod 101 may be covered within the sleeve 103 and the sheath 1022 and protected from the corrosion by the external environment.

Figure 3:
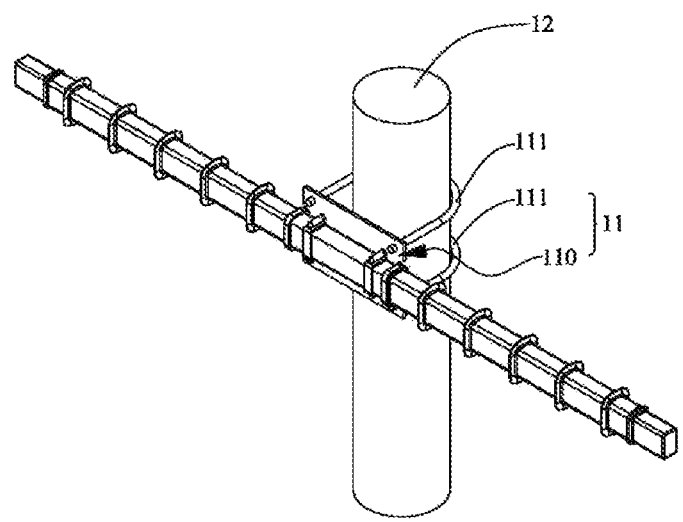
Figure 4:
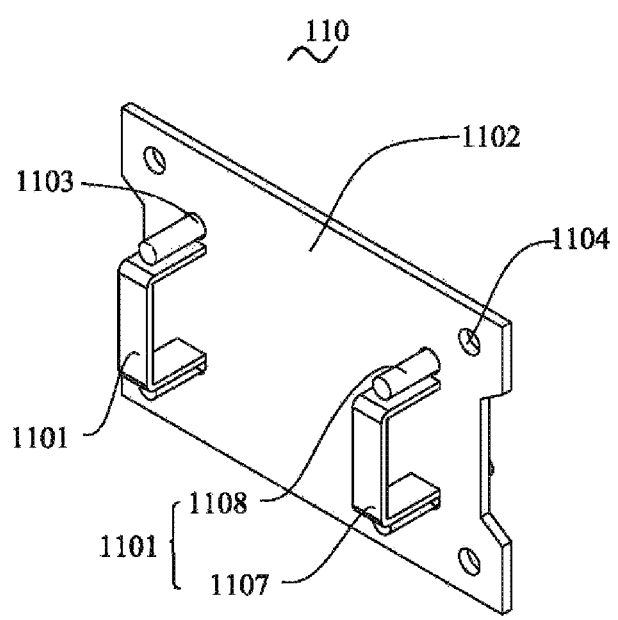
Figure 5:
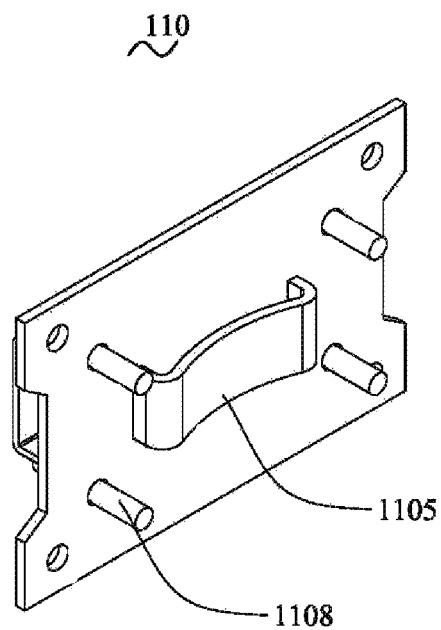

Referring to FIGS. 3 to 5, the above-mentioned composite crossarm 10 may be fixed on the pole body 12 by an additional fixing device 11. The fixing device 11 includes a crossarm receiving member 110 and a pole body connecting member 111. The crossarm receiving member 110 is used for receiving sleeve 103, and the pole body connecting member 111 is used for connecting the pole body 12 and the crossarm receiving member 110.

The crossarm receiving member 110 may include a crossarm hoop 1101 and a connecting plate 1102. The crossarm hoop 1101 may include two U-shaped hoops 1101 on the left and right sides of the pole body 12. The connecting plate 1102 may be a rectangular plate. The pole body connecting member 111 may be a pole body hoop 111 including two U-shaped hoops 111 on the upper and lower sides of the composite crossarm 10. The connecting plate 1102 may be provided with four mounting holes 1103 corresponding to the crossarm hoops 1101 and four mounting holes 1104 corresponding to the pole body hoop 111. One side of the connecting plate 1102 facing the pole body 12 may be provided with an arc-shaped member 1105. The curvature of the arc-shaped member 1105 is adapted to the outer surface of the pole body 12, and the arc-shaped member 1105 can increase the contact area between the connecting plate 1102 and the pole body 12 to make the fixing more stable.

Considering the shape of the sleeve 103 and the convenience of fixing, the U-shaped hoop 1101 includes a rectangular hoop 1107 and a cylindrical member 1108 fixed to the rectangular hoop 1107. The rectangular hoop 1107 is adapted to the shape of the sleeve 103, and the cylindrical member 1108 is fixed by a bolt after passing through the mounting hole 1103.

In actual mounting, the composite crossarm 10 and the crossarm hoop 1101 can be mounted first, that is, after the two U-shaped hoops 1101 partly surround the sleeve 103 along a circumferential direction of the sleeve 103, the two U-shaped hoops 1101 may pass through the mounting hole 1103 and be fixed by bolts. When the composite crossarm 10 is located on a proper position on the pole body 12, the two U-shaped hoops 111 may pass through the mounting holes 1104 of the connecting plate 1102 to fix the composite crossarm 10 on the pole body 12.

The U-shaped hoop 1101 is fixed on the sleeve 103. During long-term operation, the U-shaped hoop 1101 may slide to the left or right on the sleeve 103, and when it slides to the edge of the sleeve 103, the sheath 1022 may be damaged. In order to avoid such sliding, alternatively, a groove (not shown) may be provided on the position of the sleeve 103 corresponding to the U-shaped hoop 1101, which may play a role in limiting movement.

In this embodiment, when the composite crossarm 10 is fixed on the pole body 12, since the middle region is correspondingly fixed on the pole body 12, both ends of the composite crossarm 10 can be used for supporting the conductor wires, so that the arrangement of at least two phases of conductor wires can be realized. The reason for this is that in some cases, the middle region of the composite crossarm 10 may also be provided with the metal fitting for hanging the line or the pin insulator to support the conductor wire. The composite crossarm 10 is convenient to mount and simplifies the complexity of high altitude operations;

The above-mentioned composite crossarm 10 is generally used at a voltage less than or equal to 35 kV, for example, a distribution line at 10 kV, 20 kV or 35 kV. During a long-term operation of the line, for the middle region of the composite crossarm 10 connected to the pole body 12, the load is directly applied on the sleeve 103. The sleeve 103 has sufficient supporting strength to avoid affecting the mechanical properties of the core rod 101.

Optionally, in other specific embodiments, the insulating layer may also be an anti-corrosion functional layer coated on the outer peripheral surface of the core rod, such as a fluorocarbon lacquer. The fluorocarbon lacquer may be coated on regions of the core rod other than the load-bearing member. Of course, the fluorocarbon lacquer may also be covered on the outer peripheral surface of the load-bearing member, so that the fluorocarbon lacquer and the load-bearing member are in seamless contact. The anti-corrosion functional layer also does not have the ability to bear the load. If the load is directly applied on the anti-corrosion functional layer, it may easily cause the anti-corrosion functional layer to fall off to expose the core rod to the air, which may cause decrease in the strength and the mechanical properties.

In other specific embodiments, the sleeve may be provided with a groove or a projection to limit the movement of the crossarm receiving member arranged on the sleeve.

Second Embodiment

In this embodiment, the configuration of the composite crossarm is similar to that in the first embodiment, and details are not described herein again. The difference is that the composite crossarm is fixed to the pole body through a fixing device which is a different component.

Figure 6:
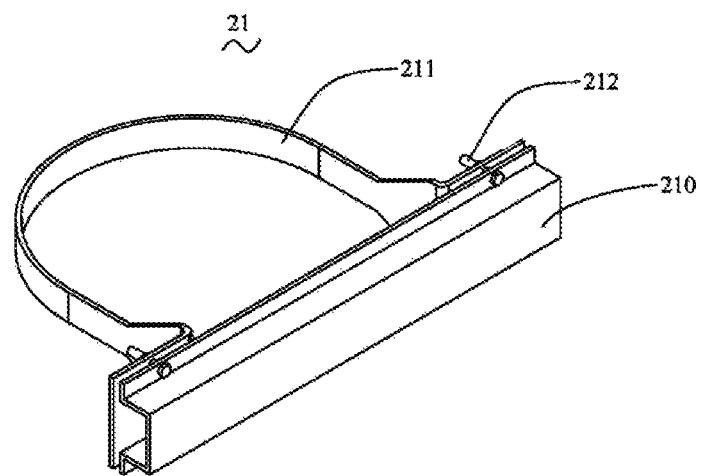
Figure 7:
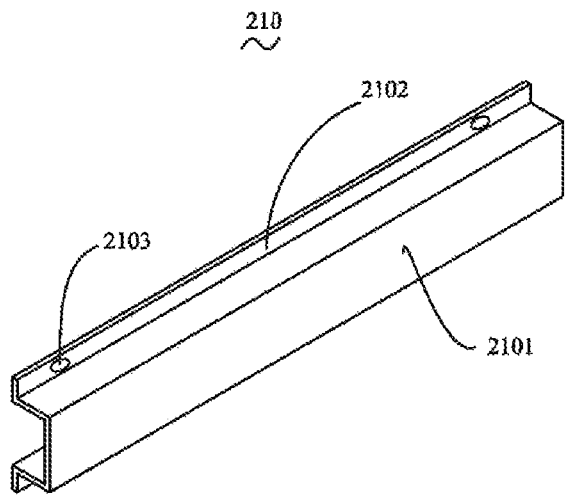
Figure 8:
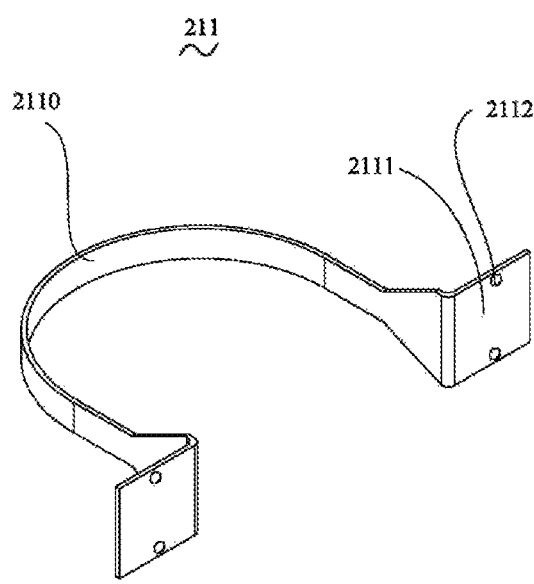

As shown in FIGS. 6-8, the fixing device 21 may include a crossarm receiving member 210 and a pole body connecting member 211.

The crossarm receiving member 210 may include a receiving portion 2101 and connecting sheets 2102 arranged on two sides of the receiving portion 2101. The receiving portion 2101 may be used for receiving the sleeve 103 on the composite crossarm 10, and the connecting sheet 2102 may be used for connecting the pole body connecting member 211. The receiving portion 2101 may be a housing having a hollow rectangular cross section, and the inner wall of the housing may correspond to the outer surface of the composite crossarm to be received. Of course, the cross section of the inner chamber of the housing may also be in a shape of a circle or other polygons.

The pole body connecting member 211 may include a U-shaped hoop 2110 and connecting sheets 2111 connected to both sides of the U-shaped hoop 2110. The U-shaped hoop 2110 may be used for receiving the pole body 12, and the inner surface of the U-shaped hoop 2110 may corresponds to the surface of the pole body 12 received therein. The connecting plate 2111 may be provided with four mounting holes 2112, and the connecting plate 2102 may be provided with four mounting holes 2103 corresponding to the connecting sheet 2111.

The composite crossarm may be fixed to the pole body by the fixing device 21. The sleeve 103 may be located in the receiving portion 2101. The receiving portion 2101 may partially surround the composite crossarm along the outer peripheral surface of the sleeve. The U-shaped hoop 2110 may partially surround the pole body. The fastener 212 may connect the pole body connecting member 211 and the crossarm receiving member 210 together through the corresponding holes in the connecting sheet 2111 and the connecting sheet 2102. Optionally, the fastener 212 may be a bolt.

Third Embodiment

Figure 9:
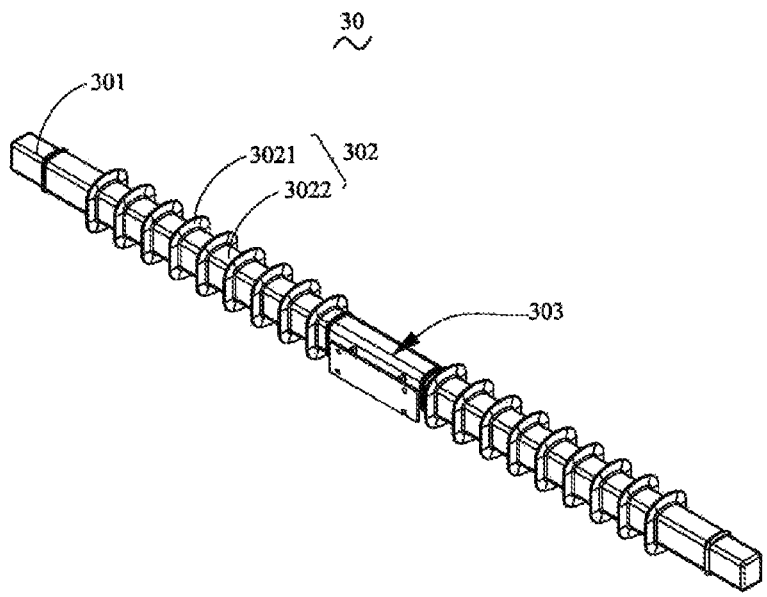
Figure 10:
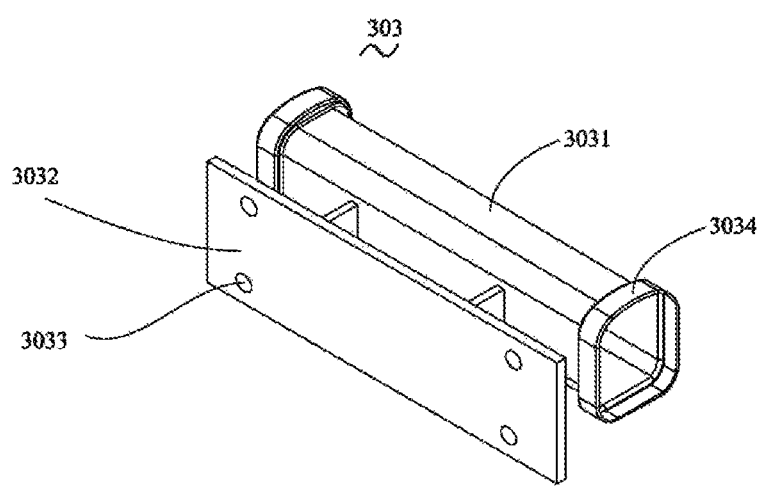
Figure 11:
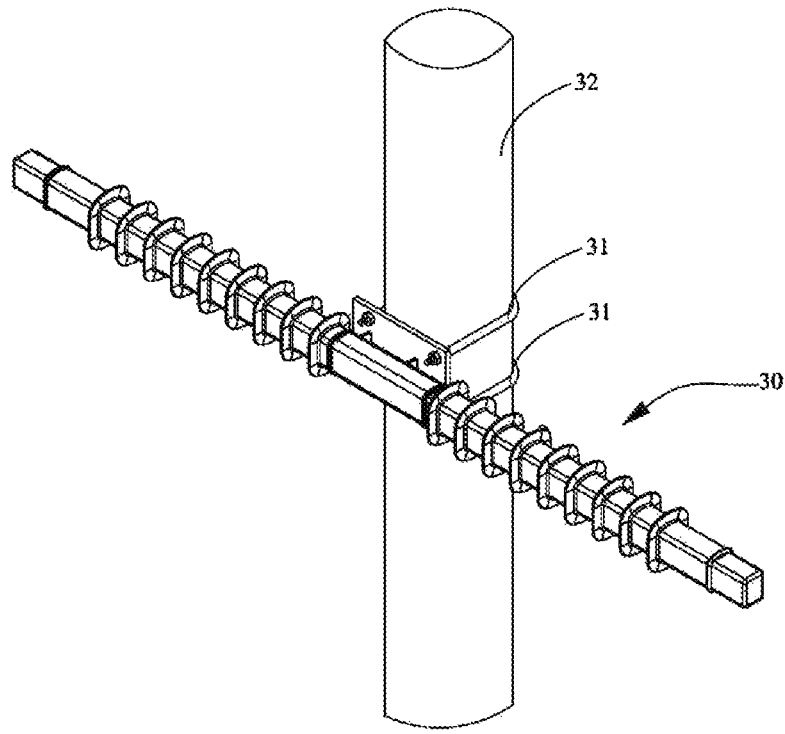
Figure 12:
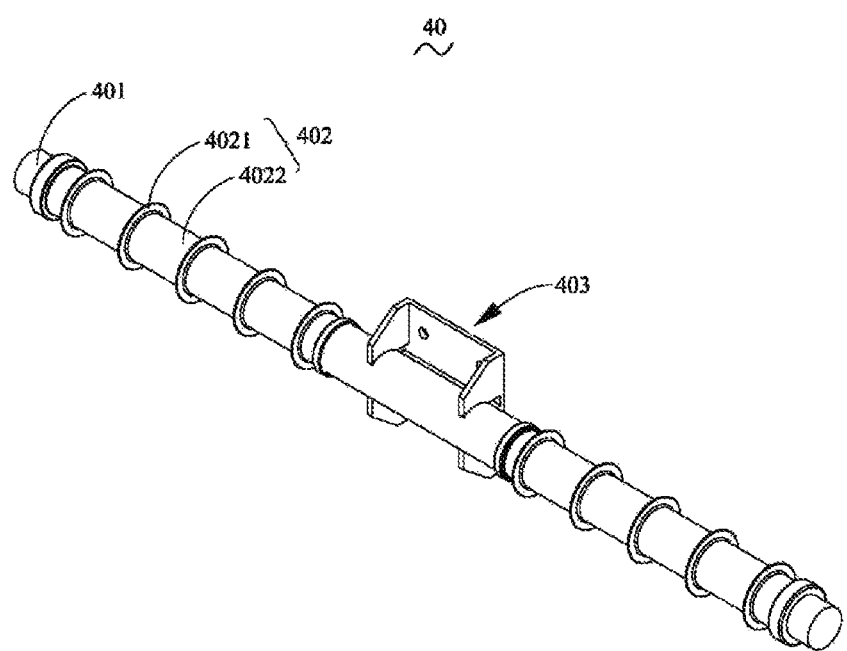
Figure 13:
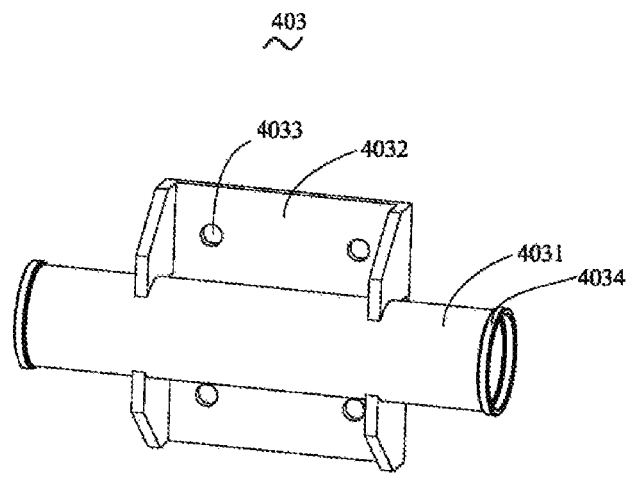

As shown in FIGS. 9-11, the composite crossarm 30 may include a core rod 301, an insulating layer 302, and a load-bearing member 303. The core rod 301 is a hollow rectangular tube body, and the core rod 301 is filled with polyurethane foam. The insulating layer 302 may be a silicone rubber shed 3021 and a sheath 3022 integrally formed on the core rod 301 by injection molding. The load-bearing member 303 may be a sleeve mechanism 303, which may be generally made of metal, and may include a sleeve 3031 and a connecting plate 3032. The sleeve 3031 may cover and be fixed to the outer peripheral surface of the core rod 301. The connecting plate 3032 may be fixed to one side of the sleeve 3031, and used for connecting the pole body 32.

After the core rod 301 is formed by the pultrusion process, the sleeve mechanism 303 may be fixed to the core rod 301 by gluing or crimping, so that the sleeve 3031 may cover all the outer peripheral surface of the middle region of the core rod 301, and the silicone rubber shed 3021 and the sheath 3022 are integrally formed on two sides of the sleeve 3031 respectively by injection molding. The sleeve 3031 may be provided with a flange 3034, and the flange 3034 is provided to facilitate the sealing connection with the sheath 3022.

A connecting plate 3032 is provided on one side of the sleeve 3031 facing the pole body 32. Alternatively, the connecting plate 3032 and the sleeve 3031 may be integrally formed by compression-molding, or the connecting plate 3032 may be fixed to the sleeve 3031 by welding or bonding. The connecting plate 3032 may be connected to the pole body 32 through a pole body connecting member 31 including U-shaped hoops 31 on the upper and lower sides of the composite crossarm 30. The U-shaped hoops 31 may be sleeved on pole body 32 and partly surround the outer peripheral surface of the pole body 32. The connecting plate 3032 is provided with four mounting holes 3033 cooperated with the U-shaped hoops 31. After passing through the mounting holes 3033, the U-shaped hoop may be fixed by bolts, so that the composite crossarm 30 can be fixed on the pole body 32.

The composite crossarm 30 is fixed on the pole body 32. During long-term operation, the load at the connection portion between the pole body 32 and the composite crossarm 30 may be applied on the sleeve 3031, which cannot cause damage to the insulating layer 302, and can avoid the corrosion of the core rod 301 caused by the external environment.

In other specific embodiments, the connecting plate 3032 may be provided with an arc-shaped member welded to the connecting plate 3032, which can increase the stressed area and make the fixing more stable when being connected to the transmission pole.

Fourth Embodiment

Please refer to FIGS. 12-15 together. The composite crossarm 40 may include a core rod 401, an insulating layer 402, and a load-bearing member 403. The core rod 401 may be a solid round rod. The insulating layer 402 may include a silicone rubber shed 4021 and a sheath 4022 integrally formed by injection molding. The load-bearing member 403 may be a sleeve mechanism 403, which may be generally made of metal, and include a sleeve 4031 and a connecting plate 4032. The sleeve 4031 may cover and be fixed to the outer peripheral surface of the core rod 401. The connecting plate 4032 may be provided with an arc-shaped catch groove, and the sleeve 4031 may be connected within the catch groove of the connecting plate 4032 by welding.

After the core rod 401 is formed by the pultrusion process, the sleeve mechanism 403 may be fixed to the core rod 401 by gluing or crimping, so that the sleeve 4031 may cover all the outer peripheral surface of the middle region of the core rod 401, and the silicone rubber shed 4021 and the sheath 4022 are integrally formed on two sides of the sleeve 4031 respectively by injection molding. The sleeve 4031 may be provided with a flange 4034, and the flange 4034 is provided to facilitate the sealing connection with the sheath 4022.

Figure 14:
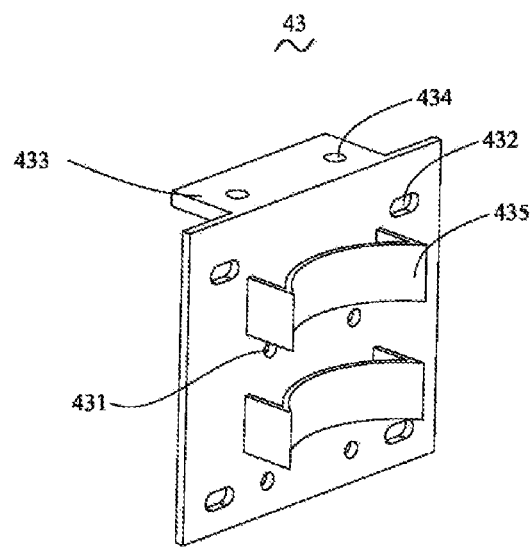
Figure 15:
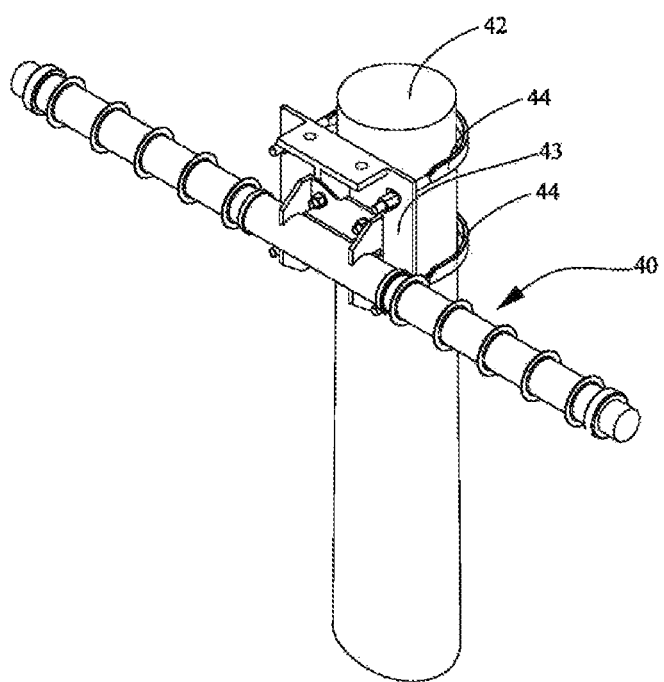

The connecting plate 4032 may be connected to the pole body 42 directly. For example, the pole body 42 may be provided with the U-shaped hoop, as adopted in the third embodiment, and after passing through the connecting holes of the connecting plate 4032, the U-shaped hoop may be connected by bolts. Specifically, in this embodiment, as shown in FIG. 14, in order to ensure the commonality of the engineering application, another pole body connecting plate 43 may be provided between the connecting plate 4032 and the pole body 42. The connecting plate 4032 may be provided with a mounting hole 4033 corresponding to the mounting hole 431 provided in the pole body connecting plate 43. The connecting plate 4032 may be fixed on the pole body connecting plate 43 by bolts, that is, the composite crossarm 40 may be fixed on the pole body connecting plate 43.

The pole body connecting plate 43 may be further provided with a mounting hole 432 for connecting the U-shaped hoop 44. One side of the pole body connecting plate 43 close to the pole body 42 may be provided with an arc-shaped member 435, which can increase the contact area with the pole body 42 and make the fixing more stable.

The composite crossarm 40 may be placed on the pole body 42, the U-shaped hoop 44 may partly surround the pole body 42, and then the U-shaped hoop 44 may pass through the mounting hole 432, and be fixed by a nut, so that the composite crossarm 40 can be fixed on the pole body 42.

The top end of the pole body connecting plate 43 may be further provided with an extended tab 433 provided with a mounting hole 434, and the mounting hole 434 may be used for connecting the top phase crossarm to realize the arrangement of the single-circuit three-phase conductor wire, which is not specifically discussed here.

The composite crossarm 40 may be fixed on the pole body 42 without providing the composite crossarm 40 with a hole. During long-term operation, the load at the connection portion between the pole body 42 and the composite crossarm 40 may be applied on the sleeve 403, which cannot cause damage to the insulating layer 402, and can avoid the corrosion of the core rod 401 caused by the external environment.

In the above-mentioned first to fourth embodiments, the load-bearing member may be provided as a sleeve or a sleeve mechanism. The advantage of doing so is that a seamless connection between the sleeve and the core rod can be achieved without the need for a perforated arrangement on the sleeve, and corrosion of the core rod caused by the external environment such as moisture can be further avoided. However, the load-bearing member is not limited to the sleeve-like mechanism, for example, the sleeve can be replaced with two hoops sleeved on the core rod, the two hoops are fastened by bolts, and the effect of covering and fixing can also be realized. Although the anti-corrosion effect is somewhat weakened, it is also within that scope of the present disclosure.

The technical content and technical features of the present disclosure have been disclosed as above. However, it should be understood that within the creative thinking of the present disclosure, various changes and improvements may be made by those skilled in the art to the above structures and materials, including the combinations of technical features disclosed or claimed herein, obviously including other combinations of these features. All these modifications and/or combinations fall within the technical field of the present disclosure and fall into the protection scope of the claims of the present disclosure.

What is claimed is:

1. A composite crossarm coupled to a pole body of a transmission pole, the composite crossarm comprising:
    a core rod having a core rod cross section;
    a load-bearing member comprising a sleeve having an inner wall with a shape that corresponds to the core rod cross section and being disposed in a middle region of the core rod connected to the pole body;
    an insulating layer sealingly coupled to the load-bearing member and disposed in a region of the core rod other than the middle region; and
    a fixing device comprising a crossarm receiving member and a pole body connecting member, wherein the crossarm receiving member receives the sleeve, and the pole body connecting member is a pole body hoop that couples the pole body to the crossarm receiving member,
    wherein the insulating layer and the load-bearing member cover, and are coupled to, an outer peripheral surface of the core rod,
    wherein the composite crossarm is coupled to the pole body by the sleeve and the fixing device,
    wherein the crossarm receiving member comprises a crossarm hoop and a connecting plate, the connecting plate is disposed between the composite crossarm and the pole body, a first side of the connecting plate facing the composite crossarm is provided with a first mounting member that cooperates with the crossarm hoop, and a second side of the connecting plate facing the pole body is provided with a second mounting member that cooperates with the pole body hoop, and
    wherein the crossarm hoop is coupled to the connecting plate by the first mounting member after partly surrounding the sleeve along a circumferential direction of the sleeve, and the pole body hoop is coupled to the connecting plate by the second mounting member after partly surrounding the pole body along a circumferential direction of the pole body.

2. The composite crossarm of claim 1, wherein the insulating layer is at least one of a shed and sheath, and wherein the at least one of the shed and sheath are sealingly coupled to the load-bearing member.

3. The composite crossarm of claim 1, wherein the insulating layer covers and is coupled to the regions of the core rod other than the middle region, after the load-bearing member covers and is coupled to the middle region of the core rod.

4. The composite crossarm of claim 1, wherein the sleeve is formed by a metal stamping process.

5. The composite crossarm of claim 1, wherein the second side of the connecting plate facing the pole body is provided with an arc-shaped member that correspond to the pole body.

6. A transmission pole comprising a pole body and the composite crossarm of claim 1 coupled to the pole body.

7. A composite crossarm coupled to a pole body of a transmission pole, the composite crossarm comprising:
a core rod having a core rod cross section;
a load-bearing member comprising a sleeve having an inner wall with a shape that corresponds to the core rod cross section and being disposed in a middle region of the core rod coupled to the pole body;
an insulating layer sealingly coupled to the load-bearing member and disposed in a region of the core rod other than the middle region; and
a fixing device comprising a crossarm receiving member and a pole body connecting member, wherein the crossarm receiving member receives the sleeve and the pole body connecting member couples the pole body to the crossarm receiving member,
wherein the insulating layer and the load-bearing member cover and are coupled to an outer peripheral surface of the core rod,
wherein the composite crossarm is coupled to the pole body by the sleeve and the fixing device,
wherein the crossarm receiving member comprises first and second connecting plates, the second connecting plate provided with an arc-shaped catch groove, the sleeve is coupled within the catch groove of the second connecting plate, the pole body connecting member is a pole body hoop, and the first connecting plate is provided with a first mounting member that cooperates with the second connecting plate, and a second mounting member that cooperates with the pole body hoop, and
wherein the pole body hoop is coupled to the first connecting plate by the second mounting member after partly surrounding the pole body along a circumferential direction of the pole body.

8. The composite crossarm of claim 7, wherein an end of the first connecting plate comprises an extended tab having a mounting hole adapted to couple to a top phase crossarm.

9. The composite crossarm of claim 7, wherein a side of the first connecting plate facing the pole body comprises an arc-shaped member that corresponds to the pole body.

10. A transmission pole comprising a pole body and the composite crossarm of claim 7 coupled to the pole body.

* * * * *